United States Patent [19]

Hirohata et al.

[11] 4,179,203
[45] Dec. 18, 1979

[54] CAMERA EQUIPPED WITH DATA RECORDING DEVICE

[75] Inventors: Michio Hirohata, Kawasaki; Toyotosi Suzuki; Hideo Yokota, both of Tokyo; Mutsuhide Matsuda, Yokohama; Tetsuya Taguchi, Kawasaki; Noriaki Sanada, Yokohama, all of Japan

[73] Assignee: Canon Kabushiki Kaisha, Tokyo, Japan

[21] Appl. No.: 742,581

[22] Filed: Nov. 17, 1976

[30] Foreign Application Priority Data

Nov. 20, 1975 [JP] Japan .............................. 50/139681
Mar. 19, 1976 [JP] Japan .............................. 51/30491

[51] Int. Cl.² ........................................... G03B 17/24
[52] U.S. Cl. ................................................... 354/106
[58] Field of Search .............................. 354/105–109, 354/219

[56] References Cited

U.S. PATENT DOCUMENTS

| | | | |
|---|---|---|---|
| 3,703,129 | 11/1972 | Goshima et al. | 354/106 |
| 3,821,768 | 6/1974 | Urano et al. | 354/219 |
| 3,889,281 | 6/1975 | Taguchi et al. | 354/105 X |
| 3,928,863 | 12/1975 | Stewart et al. | 354/109 |
| 4,001,850 | 1/1977 | Fujita | 354/219 |
| 4,025,931 | 5/1977 | Taguchi et al. | 354/106 X |
| 4,028,713 | 6/1977 | Ohashi et al. | 354/106 |
| 4,041,509 | 8/1977 | Tanaka | 354/219 X |

Primary Examiner—John Gonzales
Attorney, Agent, or Firm—Toren, McGeady and Stanger

[57] ABSTRACT

A camera having a data recording device wherein there are provided an optical path for photographic insertion of data and an optical path for displaying data. Each of these optical paths has a light inlet disposed, independently of the other, in the same light flux emitted from a data source. Photographing data are photographically applied to a film surface and are also displayed inside a view finder by means of a data signal of light which is introduced directly into each of the optical paths.

10 Claims, 11 Drawing Figures

CAMERA EQUIPPED WITH DATA RECORDING DEVICE

This invention relates to a camera having a data recording device.

A camera which is provided with a data source and an illumination light source to photographically insert and apply arbitrarily selected photographing data together with an image of a photographing object to a film surface and which permits observation of the same data image within a view finder is described in German patent application No. 2,130,396 published Dec. 23, 1971. In the conventional camera of this type, however, the light from the data source is divided by a half mirror into an optical path for photographical insertion and another optical path for display in a view finder. This has caused a limitation of optical system arrangement. Besides such inconvenience, this decreases the brightness of each optical path by half. Then, in order to ensure clear observation of the display, the illumination light source must be made to be brighter. The present invention is therefore directed to elimination of such drawbacks of the conventional cameras of this type.

It is the principal object of this invention to provide a device wherein a data inserting optical path and a displaying optical path are provided independently of each other to introduce a data signal of light into both of the optical paths without using a light divider. This arrangement makes it possible to obtain a data recording device that is capable of displaying a clear data image within a view finder using a small light source.

The above and further objects and advantages of the invention will be apparent from the following description of preferred embodiment examples taken in connection with the accompanying drawings, wherein:

FIG. 6 through FIG. 11 illustrate another embodiment example; FIG. 6 and

The embodiment examples are illustrated as applied to a compact camera of the type using a cartridge-contained film known by the name of "110 film". There is provided a data source comprising three data rings which have digits provided on their peripheries respectively representing the photographing year, month and day in such a manner as to permit adjustment of these digits from outside. A light signal emitted from a light source provided inside the ring arrangement passes through these digits and is guided to the film surface and also to an optical path of a view finder through optical paths that are arranged independently of each other. By this, the digits are photographed onto the film while the same digits are displayed inside a view finder to permit observation.

Figure 1:
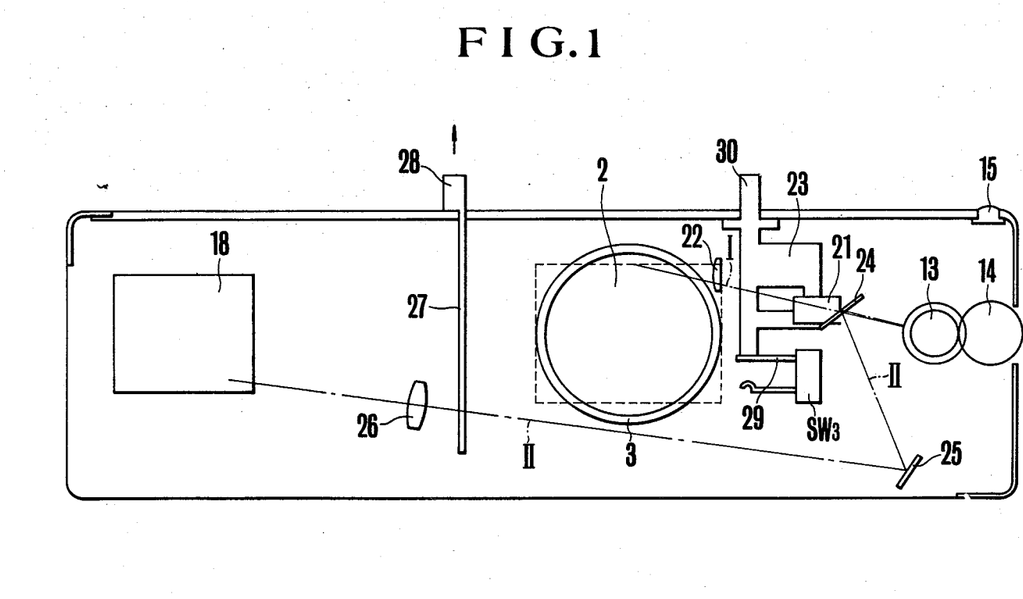
FIG. 1 is a front view schematically illustrating the arrangement of an embodiment of this invention.
Figure 2:
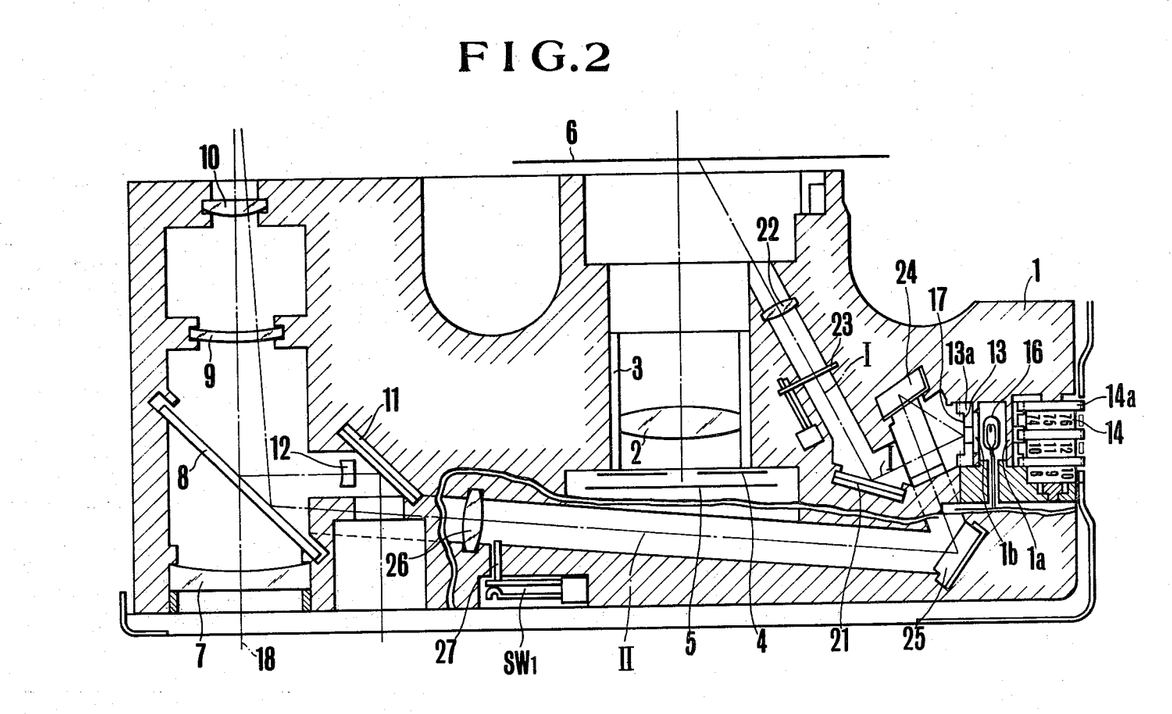
FIG. 2 is a plane view of the same embodiment shown in FIG. 1.

In FIGS. 1 and 2, a reference numeral 1 indicates a camera body; 2 indicates a photographic objective lens; 3 indicates a lens barrel; 4 indicates a diaphragm disposed in front of the lens; 5 indicates shutter blades; 6 indicates a film; 7 indicates an eyepiece of a view finder; 8 indicates a half mirror; 9 indicates a field frame reflecting mirror; and 10 indicates an eyepiece attached to the front face of the field frame by vacuum evaporation. These parts 7, 9 and 10 constitute a known albada finder. A reference numeral 11 indicates a mirror for a range finder; and 12 indicates a movable lens for the range finder. Three data rings 13 are provided with transparent digits 17 aligned on their outer circumferences and which respectively represent years, months and days as proposed by the present applicant in Japanese patent application No. Sho 49-97741. The three data rings are rotatable round a tubular shaft 1a secured to the camera body. On the outer circumference of each data ring, there is provided a toothed wheel portion 13a which engages with a corresponding toothed wheel portion 14a provided on data selection rings 14.

On the circumferential faces of the data selection rings, there are provided digits of years, months and days corresponding to those provided on the above stated data rings. A part of the toothed wheel portion of each data selection ring protrudes from a side surface of the camera. This enables a camera operator to select the data to be included in the photograph by turning each ring while watching these digits through a window 15.

The tubular shaft 1a contains an illuminating lamp 16 in a hollow portion thereof and is provided with a slit 1b in its tube wall. With the selection ring 14 operated, the digits on the data rings 13 corresponding to the digits displayed through the window are positioned to face the slit.

A reference numeral 21 indicates a reflecting mirror of an optical path I provided for photographic data insertion. A part of a signal light flux which comes from the slit and passes through the digits on the data rings is reflected by the surface of the reflecting mirror and is then directed to the film surface through an image forming lens 22 for photographic insertion of the image of the signal light flux by overlapping the signal image and the image of a photographing object.

Reference numerals 24 and 25 indicate reflecting mirrors of a display optical path II. The reflecting mirror 24 is disposed within the range of the signal light flux from the data source and is located not to hinder the optical path of the reflecting mirror 21. A part of the light flux is reflected by the reflecting mirror 24 in a downward direction, which is changed by the reflecting mirror 25. The part of the light flux then goes through the lower front of the photographing lens 2 and passes through a visibility adjustment convex lens 26; it is then reflected by the lower part of the half mirror 8 to be introduced into the optical path 18 of the finder; and, by this, the same data as the data to be inserted in a photograph are displayed in a position corresponding to the inserting position in the photograph.

The optical paths are disposed inside the camera body in a state of forked tunnels as illustrated in the drawings. However, since they communicate with each other at the light inlet, there is the possibility that a light counter-incident upon the display optical path might be reflected by the surfaces of the data rings and might come to cause the film to be exposed thereto if the reflected light passes through the photographic insertion optical path. To prevent such possibility, a light blocking plate 27 which is interlocked with a main switch to be opened and closed thereby is provided in the display optical path. Furthermore, in order to prevent the film from being exposed to light when the lamp is lighted for watching the inside of the finder while data selection is being made, there is provided another light blocking plate 23 in the photographic data insertion optical path.

Figure 3:
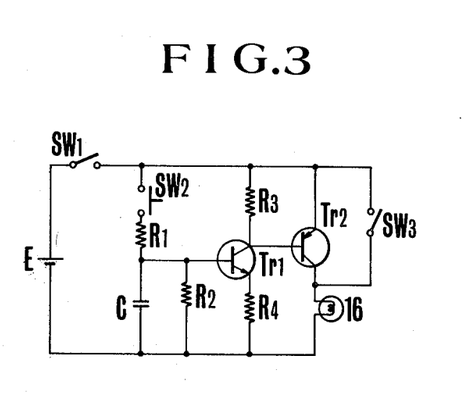
FIG. 3 is a circuit diagram illustrating a lamp lighting circuit.

In FIG. 3 which illustrates a lamp circuit, a reference symbol E indicates a power source; R1, R2, R3 and R4 indicate resistances; C indicates a time constant capacitor; Tr1 and Tr2 indicate transistors; SW1 indicates a main switch; SW2 indicates a switch which is interlocked with a shutter; and SW3 indicates a switch for display.

For photographical insertion of data, when a knob 28 shown in FIG. 1 is pulled in the direction of arrow, the light blocking plate 27 opens the display optical path. Concurrently with this, the main switch SW1 is closed. However, the lamp 16 is not lighted by this.

Then, when a check button 30 is depressed, the light blocking plate 23 closes the photographic insertion optical path. After this, the lower end of the plate 23 pushes the contact spring 29 of the switch SW3 to close the switch. With the switch SW3 closed, the lamp 16 is lighted up to display the data inside the finder as described in the foregoing. A camera operator can set data as desired by adjusting the selection rings 14 while watching the display provided inside the finder. When the button 30 is released, the switch SW3 is opened by the resilient force of the contact spring 29 to extinguish the lamp and, concurrently with this, the light blocking plate 23 opens the optical path to bring about a condition under which the photographic insertion of data is possible. Following this, a series of preparatory processes for photographing are carried out. Then, when an unillustrated shutter button is depressed, the shutter is operated by a known method and the switch SW2 which is interlocked with the shutter is closed to energize the transistor Tr2 for lighting up the lamp 16. The light from the lamp 16 passes through the digits on the rings 13 and is then photographically inserted and applied to the film 6 through the reflecting mirror 21 and the image forming lens 22.

After a preset period of time determined by the resistance R1 and the capacitor C, the transistors Tr1 and Tr2 are inverted. The inversion of the transistors extinguishes the lamp to complete the photographic insertion of data.

When such insertion is not required, the knob 28 is pushed in the direction reverse to the arrow to turn off the switch SW1. Then, the lamp is not lighted up when the shutter is released. Further, the light blocking plate 27 then blocks the optical path to ensure that the film is not exposed to the light which comes in the reverse direction through the display optical path and might be reflected by the data rings.

The data selection can be made by pushing the button 30 and by watching the inside of the finder as mentioned in the foregoing. However it can be also accomplished by watching the digits on the selection rings through the above stated window and then, for confirmation of the result of selection, checking the inside of the finder by pushing the button 30 to light up the lamp at the time of photographing.

In the above described embodiment, the data digits on the data rings are photographically inserted into a position on the film surface by means of one mirror 21 and an image forming lens with the digits being marked on the rings 13 in a reverse state. However, FIG. 4 illustrates another embodiment wherein the data are photographically inserted with 2 reflecting mirrors and one lens.

Figure 4:
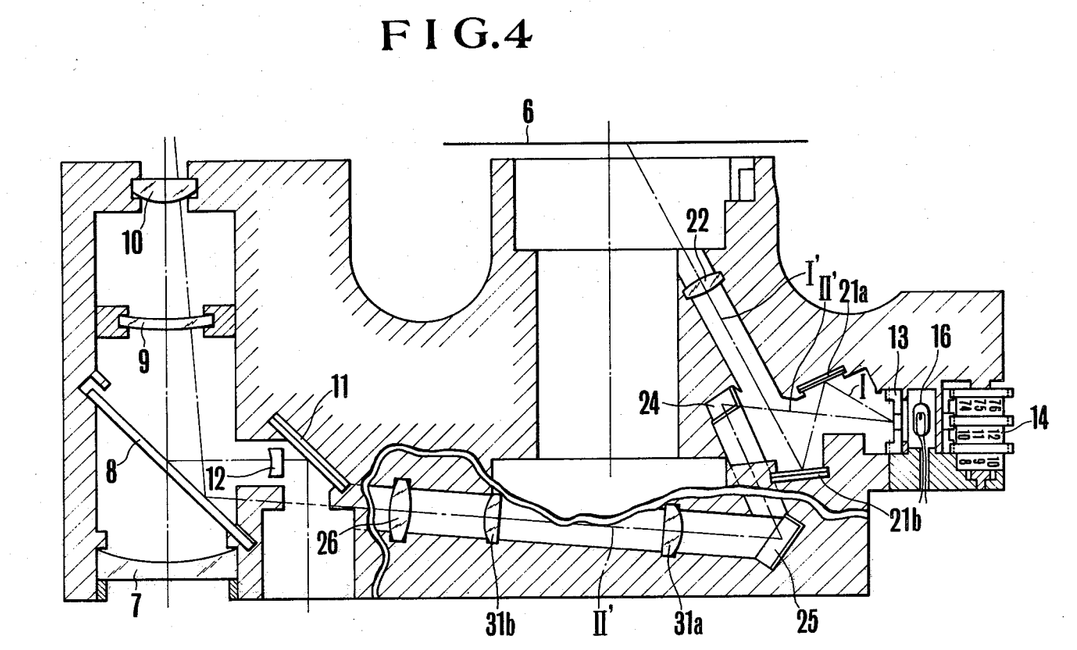
FIG. 4 is a plane view illustrating a modification of the same embodiment with the optical system thereof modified.

In FIG. 4, reflecting mirrors 21a and 21b constitute a photographic insertion optical path I'. A portion of the signal light flux which is produced from the data rings is reflected by these two reflecting mirrors before it is photographically inserted through a lens 22 into a position on the film 6 corresponding to the lower part of a picture in the same manner as in the foregoing embodiment example.

In this example, the digits on the data rings 13 are marked there in a normal state. Therefore, if the display optical system is arranged in the same manner as in the foregoing embodiment example, the digits to be displayed inside the finder would be in a reversed state. To avoid such, in this example, there are provided two cylindrical lenses 31a and 31b in a display optical path II' in such a manner as to have the digits inverted left and right to obtain normal image display. In this drawing, the light blocking plate, etc. are omitted from illustration. However, the parts other than the optical system are identical with those of the embodiment example illustrated in FIGS. 1 and 2.

Figure 5:
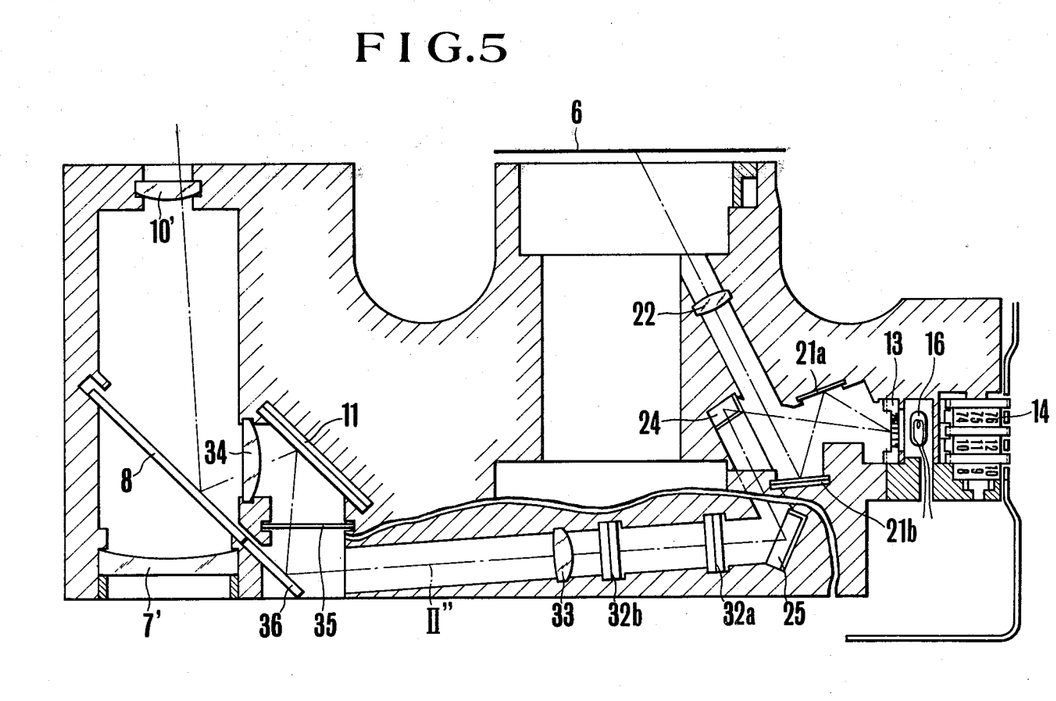
FIG. 5 is a plane view illustrating another modification of the same embodiment.

FIG. 5 illustrates another embodiment example. In the foregoing two examples, the finders are constructed as albada finders. However, in this example, the invention is applied to a camera having a bright frame type finder.

In FIG. 5, a reference numeral 35 indicates a mark plate which is provided with a bright frame and zone focus mark. Light incident through a lighting window provided in the front of the camera passes through the mark plate 35 and then reaches a pupil through a reflecting mirror 11, a convex lens 34, a half mirror 8 and an eyepiece 10' to indicate a field frame and a zone mark in the field of the view finder.

The photographic data insertion optical path I' is provided with two reflecting mirrors 21a and 21b and an image forming lens in the same manner as in the case of FIG. 4. The date display optical path II" is provided with reflecting mirrors 24 and 25, cylindrical lenses 32a and 32b and an image forming lens 33. A portion of the light flux which comes out of the data rings comes to form an image on the film 6 in the same manner as in the foregoing example. The other portion of the light flux is reflected by the reflecting mirrors 25 and 24; then is inverted upside down by the cylindrical lenses 32a and 32b; and is caused to form an image at its position on a mark plate 35 by the image forming lens 33 through a reflecting lens 36. Therefore, in the same manner as described in the foregoing, when a lamp is lighted by pushing a check button 28, an image of digits of data is displayed in the finder through the eyepiece 10', half mirror 8, lens 34 and the reflecting mirror 11.

Figure 6:
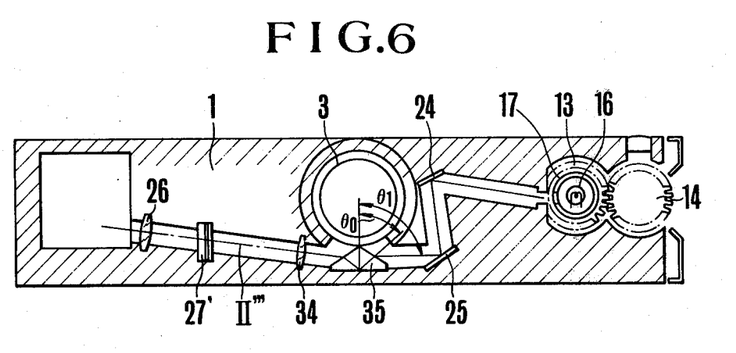
Figure 7:
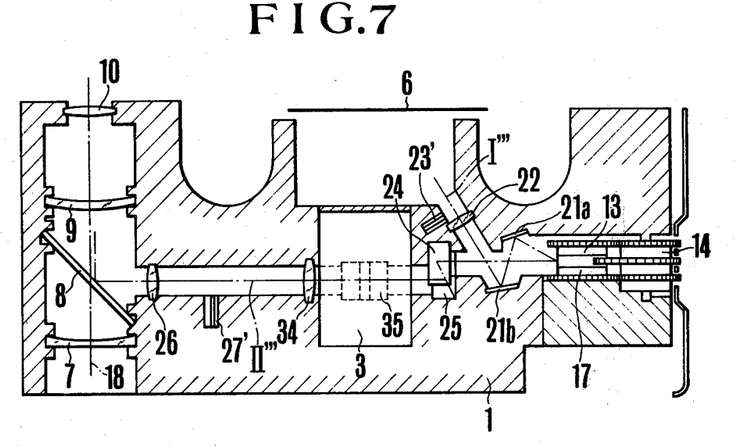
FIG. 7 being sectional views respectively showing optical paths.

In all of the embodiments described in the foregoing, the photographic data insertion optical path and the data display optical path are arranged to manually operate the light blocking plates. However, in the embodiment described below, the light blocking plate in each optical path is operated to open and close interlocking with a film winding-and-shutter charging operation and a shutter releasing operation. A lamp is lighted up by a preliminary stroke of a shutter button to permit confirmation of the data setting through a view finder. FIGS. 6 and 7 illustrate data inserting and displaying optical paths. In these drawing the same reference numerals as those used in the foregoing embodiment examples indicate like parts.

Referring to FIGS. 6 and 7, a photographic data insertion optical path I''' is provided with two mirrors 21a and 21b and an image forming lens 22 in the same manner as in the case of FIG. 4. The data signal light flux emitted from the data rings 14 is guided to the film 6. A part of the signal light flux is directed to the lower part of the camera by the two mirrors 24 and 25 through a display optical path II'''; and is introduced into a finder optical path through a prism 35, an image forming lens 34 and a visibility adjustment lens 26 arranged below the photographing lens barrel. Both the optical paths I''' and II''' are equipped with the light blocking plates 23' and 27'. In this embodiment, the prism 35 is used in the display optical path for the purpose of minimizing the reflecting surfaces required for turning the image upside down with a minimum curvature of the optical path. Assuming that the width of the incident light flux is b and the angle of incident is $\theta$, with a reflecting mirror used, the required width W of the reflecting mirror is $W = b/\cos \theta$. Thus the width W of the reflecting mirror increases with the angle of incidence $\theta$, accordingly, with a reflecting mirror used, if the apparent angle of incidence $\theta_1$ is extremely great as illustrated, the width of the reflecting mirror must be great. However, the use of such a wide reflecting mirror makes the actual construction of an optical path difficult. Further, in order to reduce the angle of incidence, it is necessary not only to increase the thickness of the camera but also to make the optical path complex. In this embodiment, however, despite of the great apparent incident angle $\theta_1$, the incidence angle $\theta_0$ to the reflecting surface is made smaller by the use of the prism and the data light flux is turned upside down with the small reflecting surface.

Figure 8:
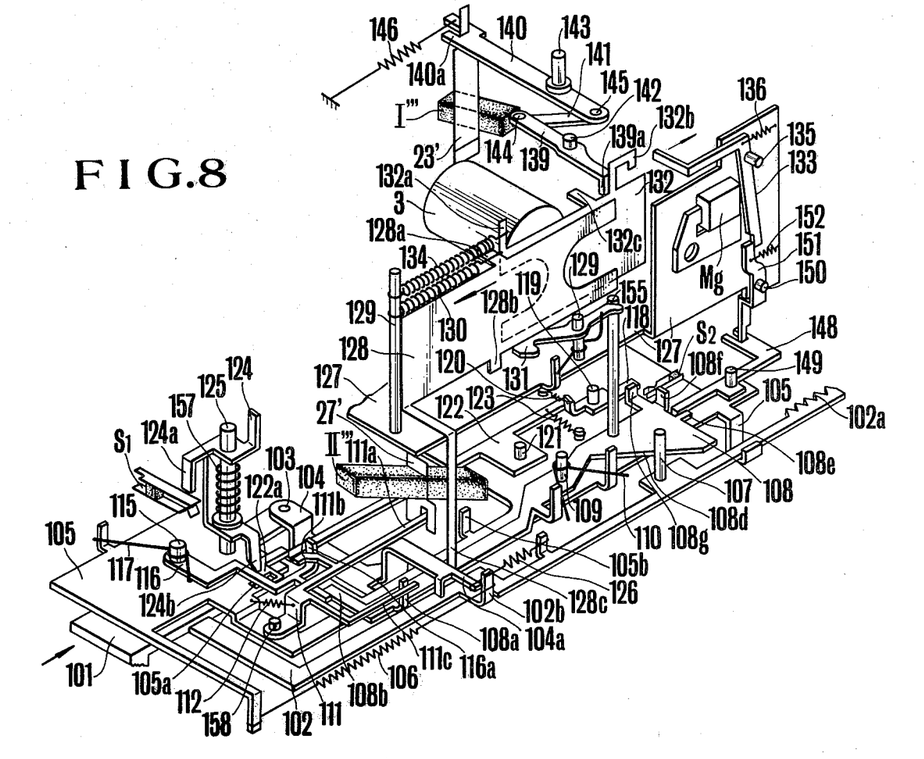
FIG. 8 being an oblique view illustrating the operation mechanism of a shutter of the optical path.

Referring now to FIG. 8, the light blocking plates 23' and 27' of the optical path are operated through the following arrangement.

Figure 9:
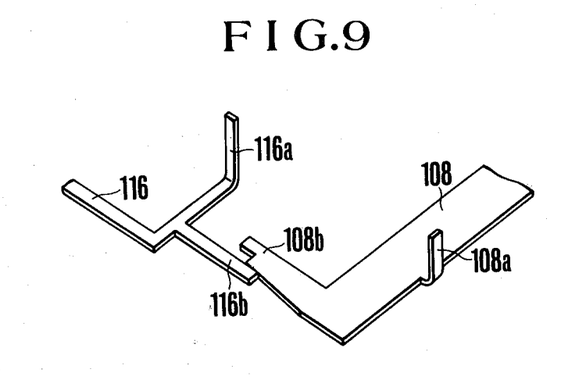
FIG. 9 and FIG. 10 being oblique views illustrating a part of the mechanism shown in FIG. 8.
Figure 10:
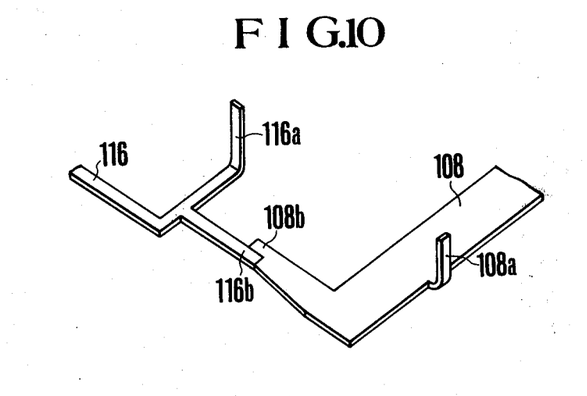

In FIG. 8, a base plate 105 is secured to a camera body 1 for mounting thereon a shutter charging-and-film winding mechanism. A slider 101 is provided for shutter charging and film winding and is slidably carried on the base plate 105. The arm 102 of the slider 101 is provided with a rack 102a which engages with a toothed wheel of an unillustrated film winding mechanism. A charge level 104 is provided to be rotatable on a shaft 103 secured to the slider 101. The lever 104 is pulled by a spring 126 in such a manner that the tip of its arm 104a is in engagement with a protrusion 102b of the slider. An arm 104a of the charge lever 104 is disposed to be capable of engaging with an arm 128c which extends downward from a front diaphragm 128 of a shutter. A shutter release lever 108 is rotatable on a shaft 109 and is urged by a spring 110 to rotate clockwise. A pin 155 which engages with a lever 131 for locking the front diaphragm of the shutter is securely provided on the shutter release lever 108. A lever 111, which is provided for operating a light blocking plate 27' of a display optical path II''', is arranged to be rotatable on a shaft 158, the lever 111 being urged by a spring 112 to rotate counterclockwise. The arm 111a of the lever 111 engages with a forked portion of the light blocking plate 27'. An arm 111c of the lever engages with an arm 108a of the shutter release leverl 108 and another arm 111b of the lever with an upright arm 116a of a locking lever 116. The locking lever 116 is arranged to be rotatable on a shaft 115 and is urged by a spring 117 to rotate counterclockwise. As illustrated in FIG. 9 and FIG. 10, another arm 116b of the lever 116 engages with a notch 108b provided in an arm of the shutter release lever 108 to keep the lever 108 in a state of releasing the shutter. A releasing member 124 which can be slided downward, as viewed in the drawing, along a fixed shaft 125 by pushing it with unillustrated shutter button, is normally pushed upward by a spring 157. The releasing member 124 is provided with an arm 124b which has a slanting face engaging with the arm of the locking lever 116 and also has another arm 124a for operating a switch S1, which will be described hereinafter. A release hindering lever 122 is rotatably held by a shaft 121 and is urged by a spring 123 to rotate clockwise. In the condition prior to shutter charging, an arm 122a of the lever 122 is positioned beneath the arm 124b of the shutter release member 124 to hinder the shutter button from being pushed. An intermediate lever 118 is rotatably held by a shaft 119 between the lever 122 and the shutter release lever 108 is urged by a spring 120 to rotate clockwise. An arm of the intermediate lever 118 engages with the lever 108 while another arm thereof engages with the release hindering lever 122 to hold the lever 122 in its shutter release hindering position against the force of the spring 123.

A base plate 127 is provided for mounting a shutter mechanism thereon. The front diaphragm 128 and the rear diaphragm 132 of the shutter are arranged to be slidable over the base plate 127 and are urged to travel in the direction of arrow by drive springs 130 and 134 which are respectively provided between a pin 129 and these diaphragms. A reference numeral 131 indicates a locking lever which engages with a protrusion 128b of the front diaphragm 128 to lock the front diaphragm 128 in a state of being charged. The locking lever 131 is rotatably held by a shaft 129 provided on the base plate 127 and is urged by a spring to rotate counterclockwise. The tail end of the locking lever 131 engages with the pin 155 of the release lever 108. A lever 133 which locks a rear diaphragm 132 of the shutter at a charged position has an arm to be engaged with a protrusion 132b of the rear diaphragm and another arm to be attracted by an electromagnet Mg. The lever 133 is rotatably held by a shaft 135 to rotate thereon and is urged by a spring 136 to rotate in the same direction as that of the attracting force of the electromagnet. An intermediate lever 151 which is rotatable on a shaft provided on the base plate 127 is urged by a strong spring 152 to rotate clockwise. One arm of the lever 151 engages with the locking lever 133 to separate the lever 133 from the electromagnet Mg against the force of the spring 136. Another arm of the lever 151 engages with a protrusion 108e of the release lever 108 through a lever 148 which is arranged to be rotatable on a shaft 149 provided on the base plate 105. A lever 140 which is provided for operating a light blocking plate 23' of the photographic data insertion optical path I''' is arranged to be rotatable on a shaft 143 provided on a fixed part of the camera and is urged by a spring 146 in the direction of opening the optical path. A forked end 140a of the lever 140 engages with the light blocking plate 23'. The lever 140 is interlocked with a lever 139 through an interlocking plate 141 which is coupled to the other end of the lever 140 with a pin 145. The lever 139 is rotatable on a fixed shaft 142 and is coupled to the interlocking plate 141 by means of a pin 144 provided at one end thereof. The other end 139a of the lever 139 is arranged to engage with a protrusion 132c provided on the rear diaphragm of the shutter.

Figure 11:
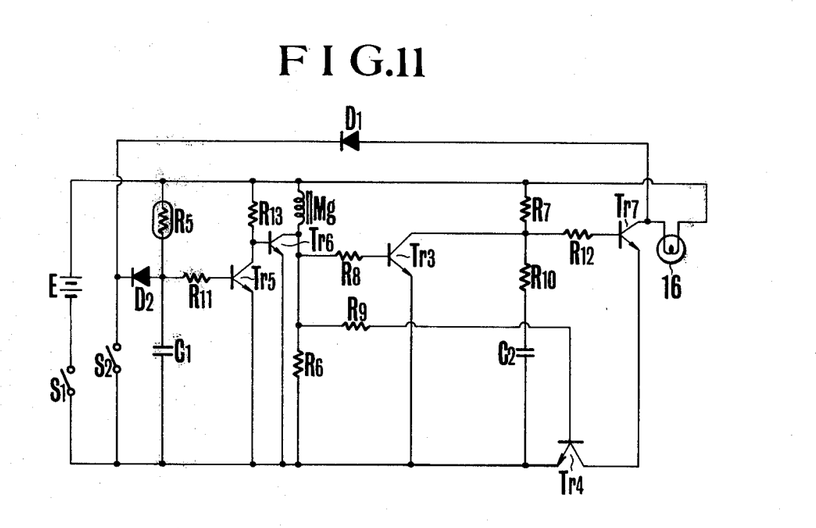
FIG. 11 illustrating a lamp lighting circuit.

In the circuit illustrated in FIG. 11, a reference symbol E indicates a power source; S1 indicates a main switch which is closed by depression of a shutter button; R5 indicates a photoelectric light measuring element which constitutes a time constant circuit in combination with a capacitor; S2 indicates a trigger switch which opens in response to the start of shutter operation; Tr5 and Tr6 indicate switching transistors; Mg indicates an electromagnet provided for locking a rear diaphragm of a shutter; R11 and R13 indicate resistances; and D2 indicates a diode. These parts constitute a shutter control circuit. A lamp 16 is provided for data illumination. A capacitor C2 is provided to constitute together with a resistance R10 a time constant circuit for lighting the lamp. Reference symbols Tr3, Tr4 and Tr7 indicate transistors; R6, R7, R8 and R9 indicate resistances; and D1 a diode.

The arrangement described in the foregoing operates as follows:

FIG. 6 illustrates a condition prior to shutter charging and the light blocking plate 23' which is provided for the photographic insertion optical path is open while another light blocking plate provided for the data display optical path is closed. Under this condition, when the slider 101 is pushed against the force of the spring 106 in the direction of arrow, the arm 102 of the slider also moves to rotate an unillustrated toothed wheel with the rack 102a thereof for forwarding the film. Concurrently with this, the charge lever 104 also moves. The charge lever 104 engages with the arm 128c of the front diaphragm 128 of the shutter and causes the front diaphragm and the protrusion 132a to move the rear diaphragm 132 which engages with the protrusion 128a of the front diaphragm in the same direction against the springs 130 and 134. Then, the shutter charging operation is completed when the protrusion 128b of the front diaphragm is locked by a hooked part of the above stated locking lever 131. At the same time, the lever 104 is stopped by the protrusion 105b of the base plate 105. After this, even if the slider 101 further moves to a slight extent, the arm 128c of the front diaphragm remains unaffected by this. In the shutter charging operation, the protrusion 132c of the rear diaphragm pushes the arm 139a of the lever 139 to cause it to rotate on the shaft 142. This causes the lever 140 which is linked to the lever 139 to rotate on the shaft 143 against the spring 146. The forked end 140a of the lever 140 then causes the light blocking plate 23' to move to close the photographic data insertion optical path I'''. On the other hand, the pin 107 provided on the arm 102 pushes the cam face 108d of the above stated release lever 108 to cause the lever 108 to rotate counterclockwise on the shaft 109 and to make preparation for shutter release in the following manner: The protrusion 108f of the release lever 108 turns the switch S2 on . At the same time, another protrusion 108a of the release lever pushes the arm 111c of the light blocking plate holding lever 111 to cause it to rotate clockwise on the shaft 158. Then another arm 111a of the lever 111 causes the light blocking plate 27' to retreat from the data display optical path. The pin 155 on the lever 108 withdraws from a position of engaging with the front diaphragm clamping lever 131 to free the lever 131 and to lock the protrusion 128b of the front diaphragm. When the lever 108 has rotated counterclockwise to a sufficient degree, one arm 108b pushes the locking lever 116 to cause it to rotate clockwise on the shaft 115. Then, as shown in FIG. 10, the notched end 108b of the lever 108 engages with the arm 116b of the lever 116 to lock it. By this, the light blocking plate 27' is held in a state of opening the optical path II'''. The protrusion 108e of the release lever 108 causes the lever 151 to rotate counterclockwise on the shaft 150 through the lever 151. Therefore, the lever 133 which engages with it is pulled by the spring 136 to rotate clockwise on the shaft 135 and is pushed against the electromagnet Mg. Another arm of the lever 133 then comes to engage with the protrusion 132b of the rear diaphragm of the shutter to put the rear diaphragm in a charged state. The protrusion 108g of the release lever 108 pushes the intermediate lever 118 thus causing it to rotate counterclockwise against the spring 120. The release hindering lever 122 is pulled by the spring 123 to rotate clockwise on the shaft 121. The arm 122a of the lever 122 then withdraws from the passage of the arm 124b of the release member 124 to make depression of the shutter button possible. After these actions, the spring 106 serves to bring the slider 101 and the arm 102 back into their initial positions.

Following this, when the unillustrated shutter button is lightly pushed, the release member 124 is pushed down thereby and its arm 124a comes to turn the main switch S1 on. This causes an electric current supplied by the electric power source E to flow through the electromagnet Mg and the transistor Tr6. Then, the electromagnet Mg attracts the rear diaphragm locking lever 133 with a stronger force than the spring 152. The electric current supplied from the power source E further flows to the illumination lamp 16, diode D1 and count switch S2 to light up the lamp 16. Then, since the photographic data insertion optical path I''' is closed and the data display optical path II''' is open, the data light illuminated by the lamp does not reach the film surface but only enters the optical path of the view finder to display therein the data set on the data rings 13. The photographer observes the display for confirmation and can adjust the rings 14 for resetting the data if necessary. At this moment, there is developed no potential difference between the two terminals of the capacitor C1. The transistor Tr5 is off and, accordingly, the transistor Tr6 is on. Between the two terminals of the resistance R6, there is also developed no potential difference and the transistors Tr3 and Tr4 are off. There develops also no potential difference between two terminals of the resistance R7 and the transistor Tr7 is on.

When the shutter button is further pushed down, the slanting part 124b of another arm of the release member 124 pushes the locking lever 116 to cause it to rotate clockwise on the shaft 115. By this, the release lever is freed from the lock effected by the arm 116b of the locking lever 116. The spring 110 then causes the release lever 108 to rotate clockwise on the shaft 109. The pin 155 provided on the release lever 108 pushes the tail end of the front diaphragm locking lever 131 to make the lever 131 rotate clockwise on the shaft 129. This relieves the protrusion 128b of the front diaphragm from the lock effected by the hooked part of the lever 131 and the front diaphragm 128 of the shutter begins to travel in the direction of arrow. Then, the protrusion 108a of the release lever 108 moves away from the arm 11c of the light blocking plate holding lever 111. However, the lever 111 does not move, because another arm 111b of the lever 111 is still locked by the protrusion 116a of the locking lever 116 and the light blocking plate 27' is held in a state of opening the optical path II'''. With the release lever 108 rotating clockwise, the protrusion 108f of the lever 108 opens the switch S2. By this, the lamp 16 is extinguished and the capacitor C1 begins to be charged through the light receiving element R5. When the voltage between two terminals of the capacitor C1 reaches a preset level, the transistor Tr5 is turned on; the transistor Tr6 is turned off; and the electromagnet Mg is demagnetized. Therefore, the spring 152 causes the rear diaphragm locking lever 133 to rotate against the force of the spring 136 and the rear diaphragm is unlocked. The spring 134 then causes the rear diaphragm 132 to travel in the direction of arrow and then shutter is closed. At this moment, the lever 140 which is locked by the protrusion 132c of the rear diaphragm through the lever 139 and the coupling plate 141 is pulled and rotated by the spring 146 to cause the light blocking plate 23' to withdraw from the optical path I''' for opening the photographic data insertion optical path.

When the transistor Tr6 is turned off, there arises potential difference between two terminals of the resistance R6. Then, when the potential difference reaches a preset level, the transistors Tr3 and Tr4 are turned on; an electric current flows through the transistors Tr4 and Tr7; the lamp 16 lights up; and the data light is displayed inside the finder through the data display optical path and is, at the same time, applied to the film to form an image through the photographic data insertion optical path. Concurrently with this, the capacitor C2 begins to be charged through the resistance R10 and the transistor Tr3. Then, when the potential difference between the terminals of the resistance R7 decreases to a set value after a preset length of time, the transistor Tr7 is turned off and the lamp 16 is put out to complete the photographic insertion of data.

When the depression of the shutter button is stopped, the spring 157 lift up the release member 124 back into the original position. Then, by a spring force, the locking lever 116 is rotated following the arm 124b of the release member 124. The arm 116a of the locking lever 116 then unlocks the arm 111b of the light blocking plate holding lever 111. The spring 112 pulls and rotates the lever 111 and the arm 111a thereof moves the light blocking plate 27' to close the data display optical path. With the release lever 108 having returned into its initial position, the lever 122 is pulled by a strong spring 120 to rotate against the force of a spring 123 into its initial position.

What is claimed is:

1. A camera equipped with a data recording device comprising: a view finder, a data source having data marks required for denoting photographing data; a means for selecting and setting the data marks to be recorded; a light source for illuminating the data marks arranged on the data source, means forming a first optical path for photographic insertion of data and a second optical path for displaying data in the view finder, light blocking means movable into and out of the first optical path, the optical paths being disposed inside a camera body independently of each other in such a manner that data signal light which is transmitted through said data marks is guided separately to a photosensitive film and also to a view finder optical path, said blocking means causing the light to be transmitted along the two paths in different time stages; said data marks being directly visible along two directions; said photographic data insertion optical path and said data display optical path having at least portions extending along the respective directions and directly to the marks.

2. A camera as in claim 1, wherein light in the first optical path passes to a film location, and further comprising second light blocking means movable into and out of the second optical path for inhibiting passage of light in the second path, and control means coupled to said first blocking means for first moving said first blocking means into the first path and then retracting the first blocking means so that the data marks are guided to the view finder before being guided to the film plane.

3. A camera according to claim 2, further comprising switch means coupled to the source and one of the blocking means, and wherein opening and closing of said one of the light blocking means operates said switch means for controlling of the illumination light source.

4. A camera according to claim 2, further comprising a shutter, and wherein said light blocking means are coupled with the shutter for opening and closing the shutter.

5. A camera according to claim 4, wherein said illumination light source is coupled to a shutter control circuit for lighting control.

6. A camera equipped with a data recording device comprising:
 a data light source which exhibits data signal light for denoting photographing data and has light emission both in one direction and in aother direction;
 a means for selectively setting the data to be recorded on the film;
 an optical path for photographic recording of data and another optical path for displaying data, said optical paths being disposed inside a camera body independently of each other, light blocking means for blocking the data recording optical path when the data signal passes through the display path in such a manner that the data signal light in one direction is guided to a photosensitive film plane and the data signal light in another direction to a view finder optical path independently and at different times;
 said photographic data recording optical path and said data displaying optical path having their data light source which is used in common.

7. A camera according to claim 6, wherein a second light blocking means for the view finder optical path is provided for inhibition of the data display.

8. A camera according to claim 7, wherein opening and closing of said light blocking means are coupled for control of the illumination light source.

9. A camera according to claim 7, wherein said light blocking means are coupled with a shutter in a photographing optical path.

10. A camera according to claim 6, further comprising means for illumination of said light source in response to a camera release operation, and a data recording shutter control for controlling the illumination of said illumination light source.

* * * * *